Dec. 27, 1966     B. M. HANNON     3,293,913

JET REACTION FLOWMETER

Filed June 24, 1964     2 Sheets-Sheet 1

INVENTOR
BRUCE M. HANNON

BY *E. Janet Berry*

ATTORNEY

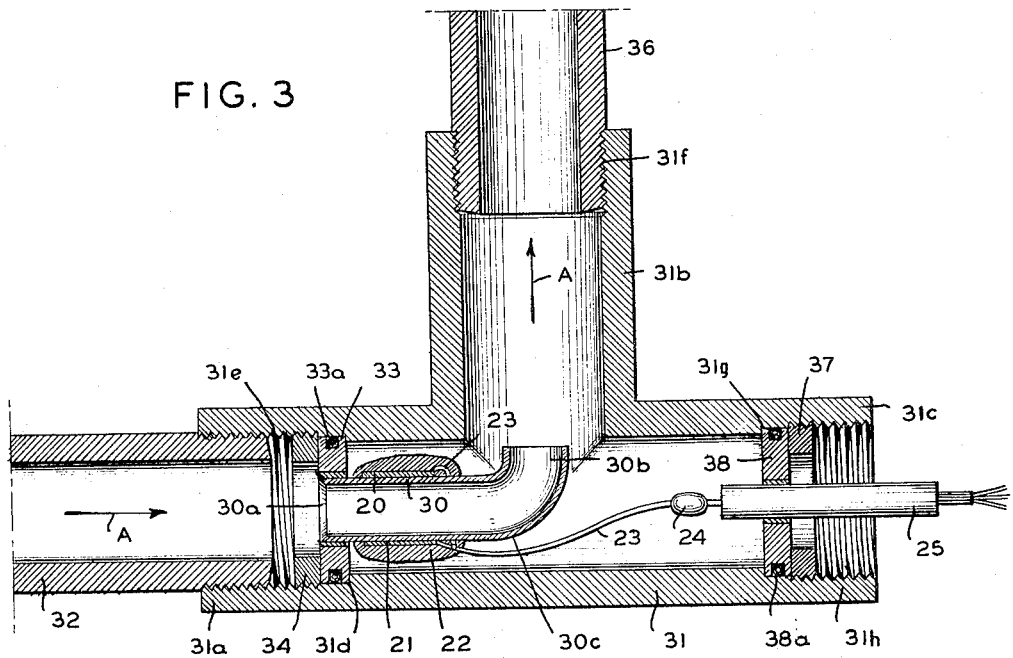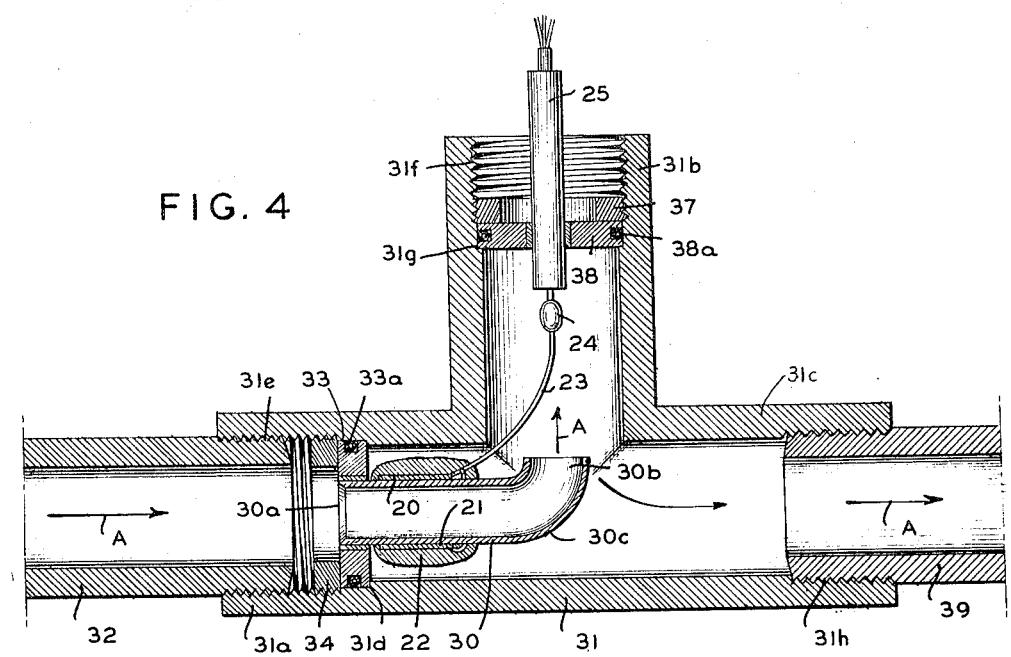

United States Patent Office 3,293,913
Patented Dec. 27, 1966

3,293,913
JET REACTION FLOWMETER
Bruce M. Hannon, Ivesdale, Ill., assignor to National Distillers and Chemical Corporation, New York, N.Y., a corporation of Virginia
Filed June 24, 1964, Ser. No. 377,735
5 Claims. (Cl. 73—228)

This invention relates to flowmeters and more particularly to fluid flowmeters operable over relatively wide ranges to record rate of fluid flow, or pressure, and such deviations therein as may occur.

It has been known heretofore to measure fluid flow in various ways through the utilization of such devices as orifice, turbine, wobble-plate meters, and the like. Apparatus of this character generally is limited to narrow ranges of applicability due to restrictions imposed by or resulting from such environmental circumstances as high or low operating temperatures, pressures required, or viscosities of fluid being metered.

It is a major purpose of the present invention to provide a novel flowmeter of the class set forth which will record flow pressure and will be immediately responsive to indicate any variation in regularity thereof.

It is a further object of the invention to provide a novel flowmeter which will function with complete efficiency and accuracy through a particularly wide range insofar as either pressure or temperature is concerned and will be capable of handling fluids of any practical viscosities.

It is a still further object of the invention to provide a jet reaction flowmeter of the class set forth which will have no moving parts, will yield but little pressure drop to the flowing fluid, and which can be manufactured with particular economy.

Further objects and advantages of the invention will be readily apparent from the following description taken in conjunction with the accompanying drawings, wherein:

FIGURE 3 is a vertical sectional view, similar to FIGURE 2, of a modified form of the invention; and FIGURE 4 is a vertical sectional view, also similar to FIGURE 2, of a further modified form of the invention.

Figure 1:
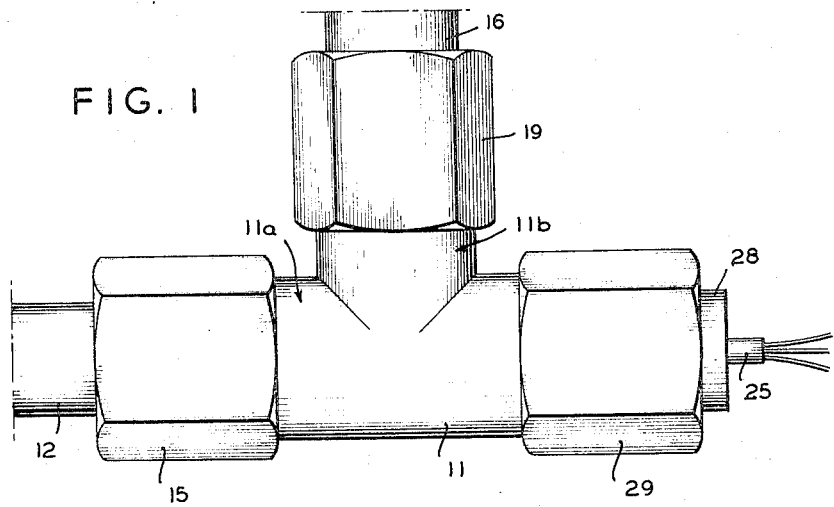
FIGURE 1 is a side elevational view of a novel flowmeter constructed in accordance with the present invention.
Figure 2:
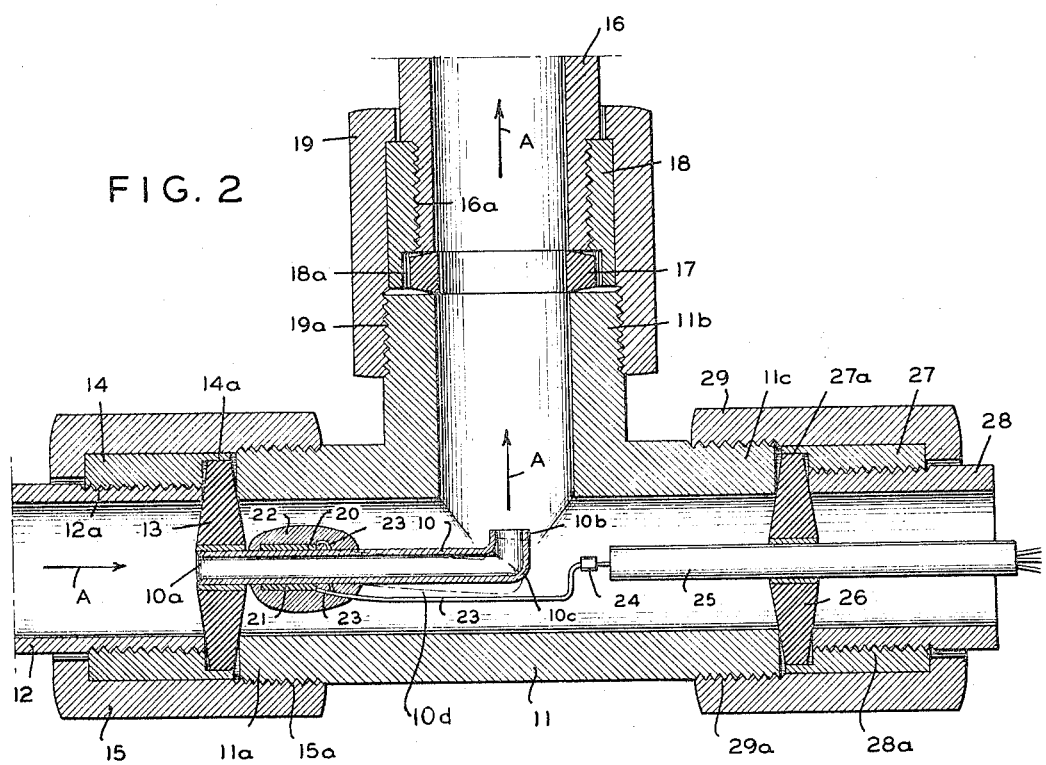
FIGURE 2 is a vertical sectional view, on a slightly enlarged scale, through the flowmeter of FIGURE 1.

As shown in the drawings, particular reference being had to FIGURES 1 and 2 thereof, the novel flowmeter of the present invention includes a metering tube 10 through which all fluid to be metered must travel under pressure. This metering tube, which is substantially L-shaped and is supported within the flowmeter housing or casing 11 as well be described more fully hereafter, includes an inlet extremity 10a and an angularly disposed outlet extremity 10b, the metering tube being provided with a 90° bend 10c adjacent the outlet extremity.

The flowmeter housing 11 may be in the form of a high-pressure T and includes an inlet passage 11a and an angularly directed outlet passage 11b. Fluid to be metered is introduced through an inlet pipe or conduit 12, enters the inlet extremity 10a of the metering tube 10 and exits through the outlet passage 11b of the flowmeter housing, the direction of movement of fluid being indicated by the flow arrows A.

Suitable means is provided for insuring an effectively sealed relationship between the inlet conduit 12, the metering tube 10, and the flowmeter housing 11. In the embodiment illustrated, the inlet extremity 10a of the metering tube 10 is secured to and sealed within a deformable sealing ring 13 which seats within an annular recess 14a provided in a collar 14 which has threaded engagement, as indicated at 12a, with the externally threaded extremity of the inlet conduit 12. A nut 15 is provided, having threaded engagement as indicated at 15a, with the externally threaded inlet passage 11a of the flowmeter housing. Tightening of the nut 15, drawing the opposed surfaces of the inlet conduit 12 and the inlet 11a of the flowmeter housing against the deformable sealing ring 13, will provide a fluid-proof union as is well known in this and related arts.

After passage through the metering tube 10, fluid leaves the flowmeter housing 11 through the outlet conduit 16 and may be conveyed directly to other apparatus (not shown) to serve its intended function. To effect fluid-proof sealed relationship between the outlet conduit 16 and the outlet extremity 11b of the flowmeter housing, a deformable ring or annulus 17, which is received within an annular recess 18a in a collar 18, is provided, this collar having threaded engagement, as indicated at 16a, with the externally threaded extremity of the outlet conduit 16. A nut 19 is provided, having threaded engagement as indicated at 19a, with the externally threaded outlet of the flowmeter housing 11. Tightening of the nut 19, drawing the opposed surfaces of the outlet conduit 16 and the outlet 11b of the flowmeter housing against the deformable sealing annulus 17, will provide a fluid-proof union as is well known in this and related arts.

Fluid under pressure passing through the metering tube 10 is required to turn 90° immediately adjacent the metering tube outlet and, as fluid exits from the metering tube, a jet thrust reaction is created in a direction at right angles to the direction of flow, such thrust reaction being proportional to the mass-velocity of the moving fluid. This reaction results in a straining and distortion of the metering tube to the position indicated diagrammatically in dotted lines at 10d in FIGURE 2 of the drawing, a compressive strain being created upon the lower surface of the metering tube while a tensile strain is created upon the upper surface thereof.

Suitable strain gages 20 and 21 are secured to opposite sides of the metering tube intermediate the extremities thereof for sensing tube deflection and these gages may be of an electrical resistance type, as is known in this and related arts, with the grids of the gages paralleling the axial direction of the metering tube. Desirably, these gages are bonded to the tube 10 by any suitable insulating material as indicated at 22.

The strain gages 20 and 21, as stated hereabove, will sense the strains caused by tube deflection and are positioned in such a manner as to provide a combined output change in resistance which will be insensitive to both temperature and pressure. Electrical connections or leads 23 convey the signal from the strain gages to the junction 24 at which point these leads are connected to a metal-sheathed and insulated three-wire conductor 25 for direct connection with a suitable strain indicator (not shown), where a strain reading directly proportional to the flow through the metering tube 10 is yielded.

The metal-sheathed conductor 25 is sealed within a deformable sealing ring 26 which seats within an annular recess 27a provided in a collar 27 which has threaded engagement, as indicated at 28a with an externally threaded sleeve 28 of relatively short length through which the conductor 25 exits. A nut 29 is provided, having threaded engagement as indicated at 29a with the externally threaded passage 11c of the flowmeter housing. Tightening of the nut 29, drawing the opposed surfaces of the sleeve 28 and the passage 11c of the flowmeter against the deformable sealing ring 26, will provide a fluid-proof union as is well known in this and related arts, insuring that fluid being metered cannot exit at this point.

It will be understood that when the metering tube 10 is stressed, as by the reactive force of fluid passing therethrough, a compressive force is exerted upon the strain gage 21 with a resultant decrease in resistance; simultaneously therewith, a tensile force will be exerted upon the strain gage 20 with a resultant increase in resistance. This instrumentation may be produced upon a chart where a graph or recording will be created illustrative of a build-up in pressure to a desired or required level and any deviation therefrom will be recorded at the instant of the occurrence thereof. Alternately, such instrumentation could be resolved upon a direct reading dial.

In the modified form of the invention illustrated in FIGURE 3 of the drawings, intended for use in connection with low pressure operations, there is less requirement for more than normal fluid-proof seals at inlet and outlet passages. As shown, the flowmeter housing 31 may be in the form of a simple T and includes an inlet passage 31a and an angularly directed outlet passage 31b. Fluid to be metered is introduced through an inlet pipe or conduit 32 and exits through the outlet passage 31b.

A metering tube 30 is provided, having an inlet extremity 30a and an angularly disposed outlet extremity 30b, the metering tube being provided with a 90° bend 30c adjacent said outlet extremity, suitable means being included for insuring an effectively sealed relationship between the inlet conduit 32, the metering tube 30, and the flowmeter housing 31. In the embodiment illustrated, the inlet extremity 30a of the metering tube is sealed within a ring 33 which seats against a shoulder 31d provided in the inlet passage 31a of the flowmeter housing and the periphery of the ring 33 is grooved for the reception of an O packing ring 33a. An externally threaded collar 34 is provided, having threaded engagement with the internally threaded portion 31e of the inlet passage 31a, for securing the ring 33 in seated position. The externally threaded extremity of the inlet conduit 32 is thread-sealed within the threaded portion 31e of the meter housing in the usual manner employed for low pressure piping, as is well known, and a modified standard piping T may be used for the meter body or housing.

After passage through the metering tube 30, fluid leaves the flowmeter housing 31 through the outlet conduit 36 and may be conveyed directly to other apparatus (not shown) to serve its intended function. To effect a fluid proof seal between the outlet conduit 36 and the flowmeter housing, the extremity of the conduit may be threaded for engagement with the internally threaded portion 31f of the outlet passage 31b of the flowmeter housing.

Fluid under pressure passing through the metering tube 30 is required to turn 90° immediately adjacent the metering tube outlet and the jet thrust reaction thus created is sensed by the strain gages 20 and 21 secured to opposite sides of the metering tube, this arrangement being identical to that described hereabove in connection with the embodiment of the invention illustrated in FIGURE 2 of the drawings.

The metal sheathed conductor 25, in the low pressure assembly, is sealed within an annulus or ring 38 which seats against a shoulder 31g provided in the passage 31c of the flowmeter housing and the periphery of this ring is grooved for the reception of an O packing ring 38a. An externally threaded collar 37 is provided, having threaded engagement with the internally threaded portion 31h of the passage 31a, for securing the ring 38 in sealed position.

In general, the metering tubes 10 and 30 are designed to have direct relationship to the density, viscosity and flow rate of the fluid to be metered. Thus, tube diameter, length, etc., may be varied to encompass a particularly wide range insofar as output strain and meter pressure differentials are concerned, dependent upon fluid characteristics.

In the further modified embodiment of the invention shown in FIGURE 4 of the drawings, and while this association has been illustrated for operation under low pressure conditions, it will function with equal effectiveness in a high pressure housing. Metered fluid leaves the meter housing 31 through the outlet passage or port 31c and is conveyed through the conduit 39 directly to appropriate apparatus (not shown) for serving its intended function. As illustrated, the extremity of the outlet conduit 39 is externally threaded for fluid-proof sealing engagement with the internally threaded portion 31h of the outlet passage 31c of the flowmeter housing.

With this association of elements, the metal sheathed conductor 25 is sealed within an annulus 38 which seats against a shoulder 31g provided in the passage 31b of the flowmeter housing, the periphery of this annulus being grooved for the reception of an O packing ring 38a. The externally threaded collar 37, having threaded engagement with the internally threaded portion 31f of the passage or port 31b serves to secure the ring 38 in sealed relationship.

In this arrangement fluid is discharged directly against the lower surface of the annulus and then is directed downwardly and exits through the flowmeter passage 31c.

There has thus been described novel flowmeter structure which utilizes an angularly bent metering tube, of restricted diameter through which fluid being metered must pass, which will react in a direction opposite to and proportional to the exiting metered fluid.

It will be apparent to those skilled in this art that various changes may be made in the invention without departing from the spirit and scope thereof; therefore the invention is not considered limited by that which is shown in the drawings and described in the specification and reference is had to the claims for summaries of the essentials of the invention, novel features of construction, and novel combinations of parts, for all of which protection is desired.

What is claimed is:

1. A jet reaction flowmeter comprising a hollow housing providing a fluid chamber including inlet and outlet passages, inlet means for connecting said housing to a source of fluid under pressure, a substantially L-shaped metering tube of reduced diameter mounted within said fluid chamber for changing the direction of fluid flow, said metering tube having an inlet extremity and being provided with a 90° bend adjacent the remote extremity thereof to provide an angularly directed outlet extremity, means for mounting the inlet extremity in sealed relationship with respect to the inlet passage of said hollow housing, strain gages mounted upon opposite exterior surfaces of said metering tube intermediate the inlet extremity thereof and said 90° bend for sensing tube deflection occasioned by the change in direction of fluid flow and indicating any deviation in fluid pressure, said strain gages being provided with electrical wiring for conveying electrical impulses occasioned by metering tube deflection to recording apparatus, said flowmeter housing being provided with a threaded outlet passage including a threaded sleeve through which said electrical wiring exists, a threaded collar having an annular recess mounted upon said threaded sleeve, a deformable sealing ring through which said electrical wiring passes in sealed relationship, and a threaded nut for forcing opposed surfaces of said sleeve and housing against opposite faces of said deformable sealing ring to provide a fluid tight connection.

2. A jet reaction flowmeter as set forth in claim 1 where the inlet extremity of said metering tube is mounted within a deformable sealing ring, the inlet means connecting said housing to a source of supply includes a threaded collar having an annular recess within which said sealing ring is received, and a threaded nut for forcing the opposed surfaces of said inlet means and said housing inlet against opposite faces of said sealing ring to provide a fluid tight connection.

3. A jet reaction fluid flowmeter comprising a hollow generally T-shaped housing providing a fluid chamber and including inlet and outlet passages, a metering tube of restricted diameter mounted within said chamber, the inlet extremity of said metering tube being mounted within the inlet passage of said housing in sealed relationship whereby all fluid to be metered must pass therethrough, said metering tube being provided with a 90° bend adjacent the remote extremity thereof to provide an angularly disposed outlet extremity and require fluid flowing through said tube to similarly change direction, and strain gages mounted upon opposite surfaces of said metering tube intermediate said inlet extremity and said angularly directed outlet extremity for sensing the reactive forces occasioned by the change in direction of fluid flow and indicating an deviation in fluid pressure, said strain gages being provided with electrical wiring for conveying electrical impulses occasioned by metering tube deflection to recording apparatus, said flowmeter housing being provided with a threaded outlet passage including a threaded sleeve through which said electrical wiring exits, a threaded collar having an annular recess mounted upon said threaded sleeve, a deformable sealing ring through which said electrical wiring passes in sealed relationship, and a threaded nut for forcing opposed surfaces of said sleeve and housing against opposite faces of said deformable sealing ring to provide a fluid tight connection.

4. A jet reaction flowmeter as set forth in claim 1 where the axis of the outlet passage of said fluid chamber is disposed at an angle of 90° with respect to the axis of the inlet passage.

5. A jet reaction flowmeter as set forth in claim 1 where the inlet and outlet passages of said fluid chamber are disposed in axial alignment.

References Cited by the Examiner
UNITED STATES PATENTS

| | | | |
|---|---|---|---|
| 1,577,950 | 3/1926 | Butler | 285—138 |
| 2,268,263 | 12/1941 | Newell et al. | 285—138 X |
| 2,765,182 | 10/1956 | Williamson | 285—138 X |
| 2,826,915 | 3/1958 | Libman et al. | 73—228 |
| 2,897,672 | 8/1959 | Glasbrenner | 73—228 |
| 2,943,486 | 7/1960 | Osgood | 73—228 |

FOREIGN PATENTS 157,135   12/1956   Sweden.

RICHARD C. QUEISSER, *Primary Examiner.*

EDWARD D. GILHOOLY, *Assistant Examiner.*